United States Patent
Wu

(10) Patent No.: US 11,047,748 B1
(45) Date of Patent: Jun. 29, 2021

(54) ADIABATIC POWER COMPENSATION DIFFERENTIAL SCANNING CALORIMETER

(71) Applicant: Frank L. Wu, Stafford, TX (US)

(72) Inventor: Frank L. Wu, Stafford, TX (US)

(*) Notice: Subject to any disclaimer, the term of this patent is extended or adjusted under 35 U.S.C. 154(b) by 0 days.

(21) Appl. No.: 16/993,802

(22) Filed: Aug. 14, 2020

(51) Int. Cl.
 *G01K 17/00* (2006.01)
 *G01K 17/04* (2006.01)
 *G01N 25/48* (2006.01)

(52) U.S. Cl.
 CPC .......... *G01K 17/04* (2013.01); *G01N 25/482* (2013.01); *G01N 25/4826* (2013.01); *G01N 25/4866* (2013.01)

(58) Field of Classification Search
 USPC ............................................. 422/51; 436/147
 See application file for complete search history.

(56) References Cited

U.S. PATENT DOCUMENTS

| | | | | |
|---|---|---|---|---|
| 8,496,374 | B2* | 7/2013 | Nishimura | G01N 25/4866 374/30 |
| 8,926,172 | B2* | 1/2015 | Wu | G01K 17/04 374/34 |
| 2005/0190813 | A1* | 9/2005 | Schick | G01K 17/00 374/10 |
| 2008/0025364 | A1* | 1/2008 | Nakatani | G01N 25/20 374/12 |
| 2010/0238968 | A1* | 9/2010 | Plotnikov | G01N 1/14 374/33 |
| 2015/0019157 | A1* | 1/2015 | Denner | G01K 3/10 702/130 |
| 2017/0307553 | A1* | 10/2017 | Jia | G01N 25/20 |

FOREIGN PATENT DOCUMENTS

WO WO-2012103601 A1 * 8/2012 ......... G01N 25/4866

* cited by examiner

*Primary Examiner* — Lisa M Caputo
*Assistant Examiner* — Nasir U. Ahmed
(74) *Attorney, Agent, or Firm* — Polsinelli PC

(57) ABSTRACT

Disclosed are systems and methods for providing an adiabatic power compensation differential scanning calorimeter to minimize a temperature difference between a sample and a reference. For instance, methods can include providing ramp-up heating power to heat a sample container and a reference container based on a preprogrammed temperature ramp rate; minimizing a temperature difference among the sample container, the reference container, and at least one furnace; providing compensating heat to the sample container and the reference container when a self-heating activity of the sample material is detected; providing container-only compensating heat to the sample container to block heat transfer from the sample material to the sample container once the self-heating activity of the sample material is detected; and providing compensating heat to the reference container to facilitate container-only compensating heat calculation and control.

20 Claims, 5 Drawing Sheets

ADIABATIC POWER COMPENSATION DIFFERENTIAL SCANNING CALORIMETER

TECHNICAL FIELD

The subject matter of this disclosure relates in general to the field of differential scanning calorimeters, and more particularly, to systems and methods for utilizing a power compensation differential scanning calorimeter that allows a sample material or reaction to depart progressively from a preprogrammed temperature ramp and self-propel to reaction completion adiabatically.

BACKGROUND calorimetry is a useful technique for measuring material properties, molecular interactions, and reaction kinetics. There are two different classes of calorimeters, dynamic calorimeter (e.g., temperature programmed) such as a differential scanning calorimeter, and stationary calorimeters such as a reaction calorimeter, which can be either adiabatic or isothermal.

Differential scanning calorimeters have been used as a convenient analytical tool to measure thermochemical and thermophysical properties such as heats of crystallization, melting, oxidation, and polymerization. Sample materials can also be subjected to preprogrammed temperature ramps, where endothermic or exothermic transformations may occur. Generally, the temperature program for a differential scanning calorimeter analysis is designed such that sample and reference temperatures increase linearly as a function of time. As such, both of the sample and the reference are maintained at nearly the same temperature throughout an experiment.

As such, there is a need to provide an apparatus and method for assessing the full energy potential of self-heating chemicals or reactions, and which overcomes the problems associated with prior methods and power compensation differential scanning calorimeters.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Differential scanning calorimeters (DSCs) can be utilized as a quick and simple screening tool for chemical instability. DSC results can be used to decide if more complex calorimetric analyses may be needed. Other analytical tools may include adiabatic or isothermal reaction calorimeters, which may be used to obtain detailed thermodynamic and kinetic properties such as heat of reaction, self-heating rate, adiabatic temperature rise, activation energy, reaction order, and conversion. While these types of calorimeters can provide quantitative information of thermodynamics and reaction kinetics, there are limitations such as being time-consuming experiments (e.g., lasting between 8 to 24 hours), requiring extensive training of the operation, and being associated with high instrumentation and maintenance cost issues.

DSCs can be divided into two classes: 1) heat flux DSC, and 2) heat/power compensation DSC. During a chemical or physical transformation, the heat absorbed or released from a sample material may be allowed to passively flow into a heat sink in a heat flux DSC, or reversely compensated by an electric heater in a power compensation DSC.

Figure 1:
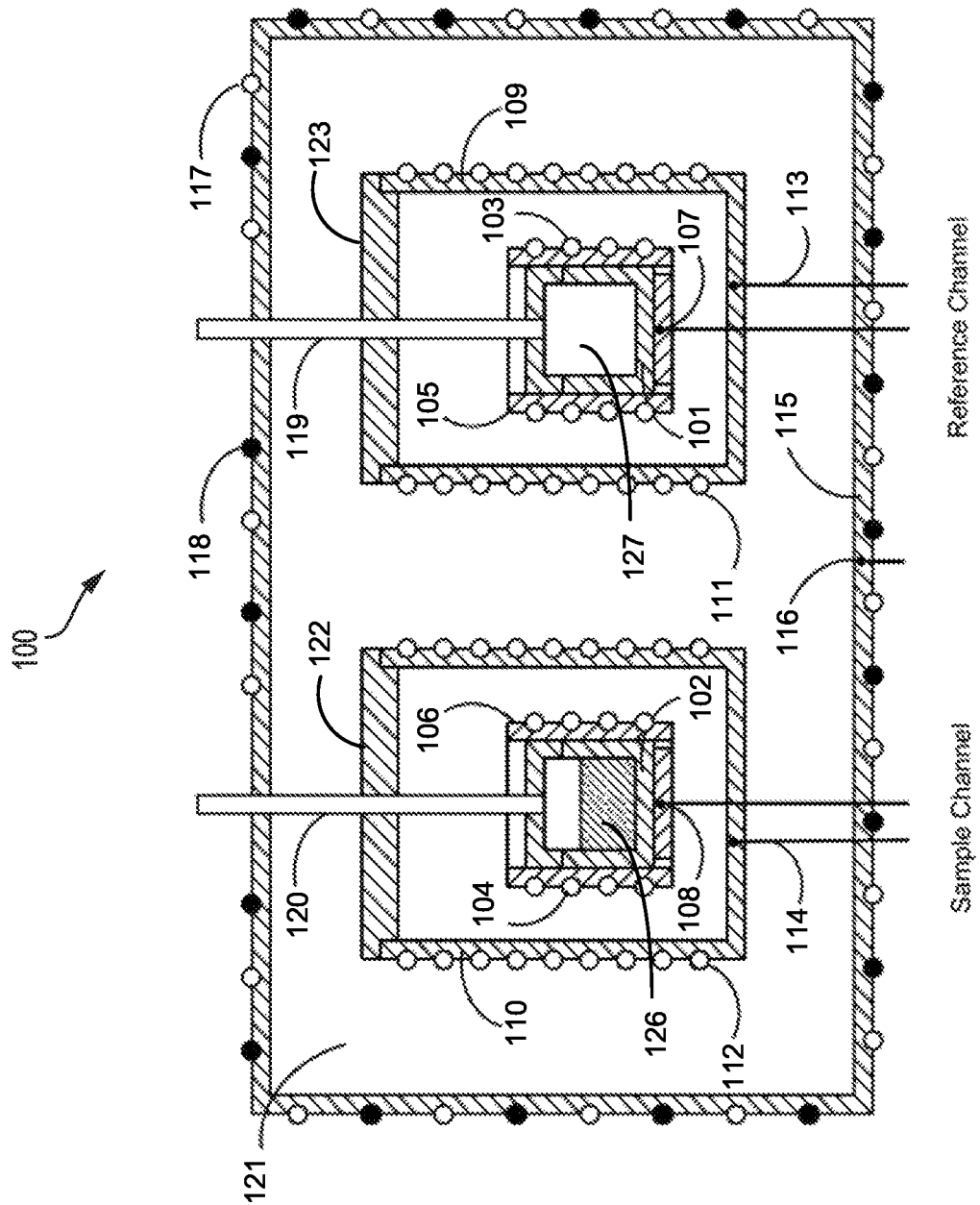
FIG. 1 illustrates a cross-sectional view of an example of an adiabatic power compensation differential scanning calorimeter with two furnaces, in accordance with some embodiments.
Figure 2:
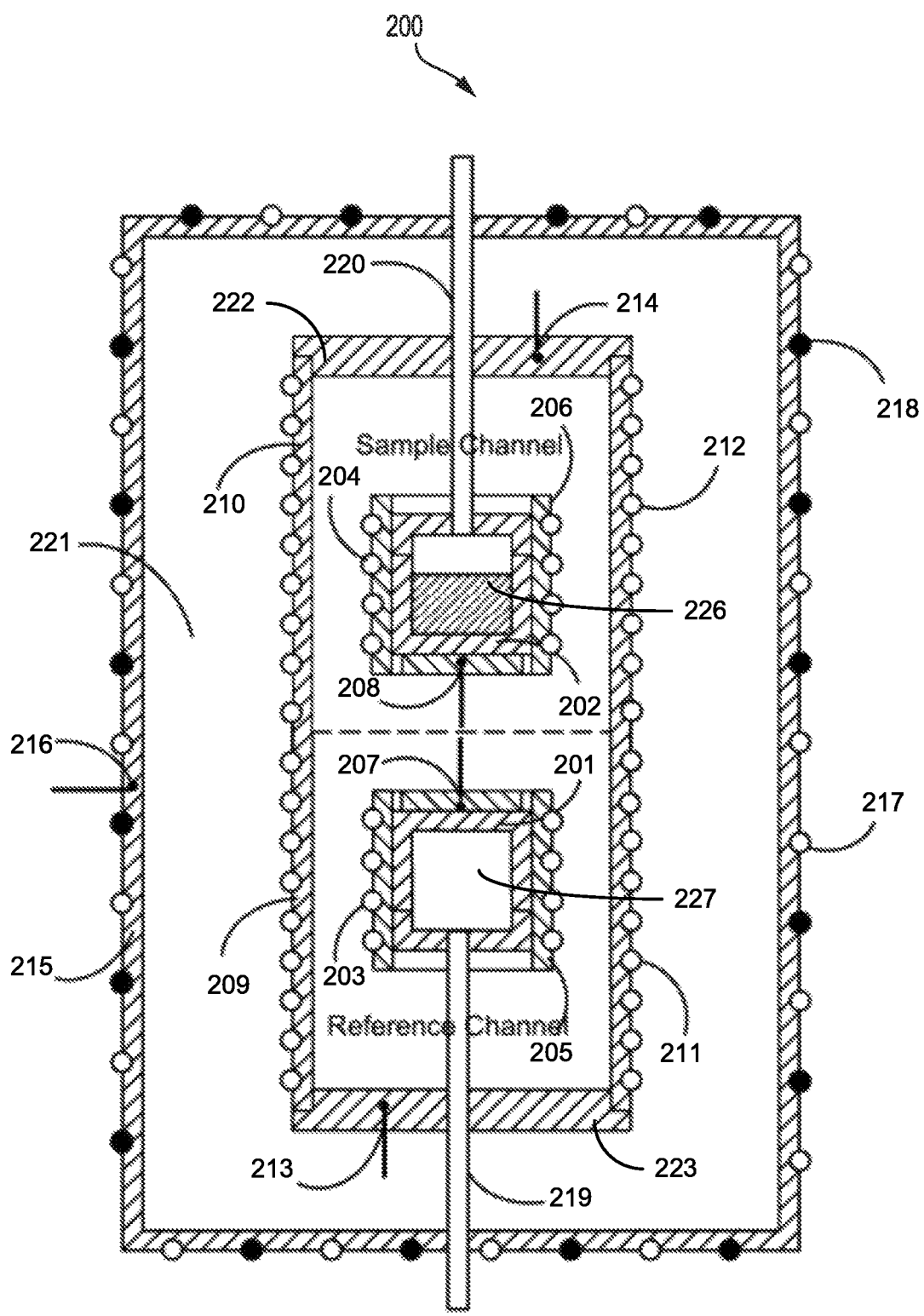
FIG. 2 illustrates a cross-sectional view of an example of an adiabatic power compensation differential scanning calorimeter with a single furnace, in accordance with some embodiments.

Power compensation DSC can be a combination of two calorimeters, one calorimeter for a sample and a second calorimeter for a reference. The two calorimeters may share a furnace (as shown in FIG. 2) or two individual furnaces (as shown in FIG. 1). The DSCs may include an apparatus and method that simultaneously apply heat energy to the sample, the reference, and the corresponding furnace(s), which can allow them to follow a preprogrammed temperature ramp. As the sample material undergoes a physical or chemical change that may be induced thermally by the preprogrammed temperature ramp, the sample temperature may begin to deviate from the reference and the preprogrammed temperatures. The sample compensation heater reversely can adjust its electric heating power (e.g., up or down) so that the temperature deviation between the sample and the reference return to zero. As an example, in an exothermic event, the heater of the sample can immediately reduce (reversely) its heating power and keep the sample temperature unchanged, in comparison to the preprogrammed ramp temperature.

A conventional power compensation DSC can be a thermoanalytical tool for measuring heat of transformation that does not include an adiabatic process for determining quantitative temperature and pressure rates and other kinetic information as described in the present disclosure, especially self-heating kinetics when compared to an adiabatic reaction calorimeter.

Reasons for the unavailability of a conventional power compensation DSC from being adiabatic include: 1) a conventional power compensation DSC reversely adjusts heat to the sample and maintains the sample temperature as the preprogrammed temperature ramp so that the self-propelled, self-heating reaction process is altered; and 2) although by minimizing the temperature difference and thus heat exchange between the sample and the reference and the furnace, a conventional power compensation DSC establishes an adiabatic boundary between the sample and the furnace, but not an adiabatic boundary between the sample material and its container, which is not a true thermodynamic adiabatic environment where accurate self-heating kinetics and thermodynamics can be determined as described in the present disclosure of adiabatic power compensation DSCs.

As an example of a self-heating process, a conventional power compensation DSC can reversely compensate the heat released from the sample material by reducing the ramp-up power, while a true adiabatic power compensation DSC as described herein can positively compensate the heat to the sample container. Therefore, a true adiabatic power compensation DSC can block the heat transfer from the sample material to the sample container so that the sample temperature can be allowed to depart from the preprogrammed temperature ramp. Furthermore, in a true adiabatic power compensation DSC, the sample material's adiabatic self-heating process is also not altered.

A conventional power compensation DSC can also be structured such that a flat sample crucible (e.g., containing 5 to 15 mg sample mass) can be placed on a flat base compensation heater plate. As with a flat-base heater design, it may be impossible to allow compensated heat transfer into a sample container without losing portions of the heat to the sample mass.

In a true adiabatic power compensation DSC as described herein, all of the heat released by the sample material or reaction can be contained in the sample material itself and consumed for the sample material's self-heating or the sample reaction's self-propelling because the heat required by the sample container to match the sample material temperature rise can be compensated by the sample compensating heater. As a container-only power compensation DSC system, the true adiabatic boundary can be established between the sample material and the sample container, thereby providing a true thermodynamic boundary condition for a true adiabatic temperature rise measurement.

In some instances, the container-only power compensation DSC system can be provided so that no heat released by the sample material or the sample reaction can be sunk into the sample container, and thus, a progressive adiabatic temperature rise can be realized.

As used herein the term "adiabatic" refers to a physico-chemical process where a sample material does not exchange heat with its surroundings, mainly with the sample container. The term "adiabatic temperature rise" refers to a temperature rise where the temperature ramp-up contribution from the user-defined linear temperature ramp is removed.

FIG. 1 illustrates a cross-sectional view of an example of an adiabatic power compensation differential scanning calorimeter (DSC) 100 with two furnaces, in accordance with some embodiments. The adiabatic power compensation DSC 100 can include a reference container 101, a sample container 102, a reference compensating heater block 105, a sample compensating heater block 106, a reference furnace 109, a sample furnace 110, and a thermal shield 115.

In some instances, the thermal shield 115 can include a temperature sensor 116, a heating element 117, and a cooling element 118. The thermal shield 115 may form a temperature-controlled chamber 121 around the reference furnace 109 and the sample furnace 110. The thermal shield 115 can be a temperature-controlled thermal shield.

In some instances, the reference furnace 109 can include a heating element 111, a temperature sensor 113, and a reference furnace lid 123. The reference furnace 109 and the reference furnace lid 123 can encapsulate a reference 127, the reference container 101, and the reference compensating heater block 105, and provide a precision temperature controlled environment. Moreover, FIG. 1 illustrates the heating element 111 being imbedded in or wrapped around the sides of the reference furnace 109. However, it is also envisioned that the heating element 111 may be imbedded in or wrapped around/thermally coupled to all sides of the reference furnace 109.

In other instances, the sample furnace 110 can include a heating element 112, a temperature sensor 114, and a sample furnace lid 122. The temperature sensor 114 of the sample furnace 110 may be the same type of temperature sensor as the temperature sensor 113 of the reference furnace 109. The sample furnace 110 and the sample furnace lid 122 can encapsulate the sample compensating heater block 106 and provide a temperature controlled environment. Moreover, FIG. 1 illustrates the heating element 112 being imbedded in or wrapped around the sides of the sample furnace 110. However, it is also envisioned that the heating element 112 may be imbedded in or wrapped around/thermally coupled to all sides of the sample furnace 110. In some instances, the average temperature of the reference furnace 109 and the sample furnace 110 may vary according to the different modes before and after the detection of a self-heating event.

In another instance, the reference compensating heater block 105 can include a heating element 103 and a reference temperature sensor plate 107. The reference compensating heater block 105 and the reference temperature sensor plate 107 can encapsulate the reference container 101 and provide a precision temperature controlled environment. For example, the reference compensating heater block 105 can surround the reference container 101 so that the majority of the outer surface of the reference container 101 is in close contact with the inner surface of the reference compensating heater block 105 to provide compensating heat transfer seamlessly to the reference container 101. The reference temperature sensor plate 107 may be thermally coupled to the bottom of the reference container 101.

In yet another instance, the sample compensating heater block 106 can include a heating element 104 and a sample temperature sensor plate 108. The sample compensating heater block 106 and the sample temperature sensor plate 108 can encapsulate the sample container 101 and provide a precision temperature controlled environment. For example, the sample compensating heater block 106 can surround the sample container 102 so that the majority of the outer surface of the sample container 102 is in close contact with the inner surface of the sample compensating heater block 106 to provide compensating heat transfer seamlessly to the sample container 102. The sample temperature sensor plate 108 may be thermally coupled to the bottom of the sample container 102.

During adiabatic power compensation operation, the reference compensating heater block 105 can provide heat to the reference container 101, and the sample compensating heater block 106 can provide heat to the sample container 102. The reference compensating heater block 105 and the sample compensating heater block 106 are capable of increasing or decreasing heating power to actively minimize temperature differences between the reference container 101 and the sample container 102.

In some instances, the adiabatic power compensation DSC 100 can further include tubes 119, 120 that may couple the reference container 101 and the sample container 102 to a differential pressure manifold (not shown in FIG. 1).

The sample container 102 can include a sample material 126 to be tested by the adiabatic power compensation DSC 100. The dimensions and material of construction of the reference container 101 and the sample container 102 can be identical.

The temperature sensor 113, the temperature sensor 114, and the temperature sensor 116 can be a platinum resistor, a thermocouple, resistance temperature detector, semiconductor-based temperature sensor, or any other temperature sensor suitable for the intended purpose and understood by a person of ordinary skill in the art. The temperature of the sample 126, 102, the temperature of the reference 127, 101, and the temperature different between the sample 126, 102 and the reference 127, 101 can be monitored by the reference temperature sensor plate 107 and the sample temperature sensor plate 108.

The heating and cooling elements 103, 104, 111, 112, 117, 118 of the reference compensating heater block 105, the sample compensating heater block 106, the reference furnace 109, the sample furnace 110, and the thermal shield 115 may be independently controlled by a microprocessor or computer (e.g., a heat compensation control system). In some instances, precision temperature control of the reference compensating heater block 105 and the sample compensating heater block 106 can be based on the differential temperature measuring sensors (e.g., the reference temperature sensor plate 107 and the sample temperature sensor plate 108).

An example of an experiment utilizing the adiabatic power compensation DSC 100 with an exothermic sample material 126 can further include utilizing a four-term ramp heating equation described by Eq. 1:

$$\delta Q/\delta t = \delta Qr/\delta t + \delta Qs/\delta t + \delta Qc-/\delta t + \delta Qc+/\delta t \quad (1)$$

where $\delta Qr/\delta t$ can be the first-term power in watts with a user-defined temperature ramp rate, $\delta Qs/\delta t$ can be the second-term power adjusted positively to compensate the sample material capacitance, $\delta Qc-/\delta t$ can be the third-term power adjusted positively to compensate an endotherm or reversely to compensate an exotherm, and $\delta Qc+/\delta t$ can be the fourth-term power adjusted positively to compensate a self-heating exotherm.

Considering an increment of reaction heat $\delta Q0$ released by the sample material or the reaction 126, or reaction within a time interval $\delta t$, the sample material capacitance Cs, and the capacitance Cv of the sample container 102 and the reference container 101, an incremental temperature rise of the sample material 126 that deviates from the preprogrammed temperature ramp can be:

$$\delta T0 = \delta Q0/Cs \quad (2)$$

However, because of the heat-sink effect of the sample container 102, a fraction of $\delta Q0$ is inevitably absorbed by the sample container 102, which can provide a smaller average temperature rise $\delta T1$ of the sample system (e.g., the sample 126 and the sample container 102), i.e., $\delta T1 < \delta T0$, which can provide:

$$\delta T1 = \delta Q0/(Cs+Cv) \quad (3)$$

The fractional heat out of $\delta Q0$ that is absorbed by the sample container 102 can be described as:

$$\delta q1 = \delta T1*Cv \quad (4)$$

In contrast to conventional power compensation DSC that reduces the compensating heat power, $\delta q1$ can be supplied to the sample 126, 102 by the sample compensating heater block 106. However, a fraction of $\delta q1$ may be absorbed by the sample container 102, which can provide another smaller sample temperature rise.

$$\delta T2 = \delta q1/(Cs+Cv) \quad (5)$$

Similarly, the fractional heat out of $\delta q1$ absorbed by the sample container 102 can be described as:

$$\delta q2 = \delta T2*Cv \quad (6)$$

Substituting Eqs. (4) into (5) can yield:

$$\delta T2 = \delta T1*Cv/(Cs+Cv) \quad (7)$$

As $\delta q2$ is compensated to the sample 126, 102, a fraction of heat from q2 can transfer to the sample container 102, which can provide an even smaller sample temperature rise:

$$\delta T3 = \delta q2/(Cs+Cv) \quad (8)$$

The fractional heat absorbed by the sample container 102 can be described as:

$$\delta q3 = \delta T3*Cv \quad (9)$$

Substituting Eqs. (6) and (7) into Eq. (8) can yield:

$$\delta T3 = \delta T1*Cv^2/(Cs+Cv)^2 \quad (10)$$

Similarly, the last fractional heat absorbed by the sample container 102 can be defined as:

$$\delta qn = \delta Tn*Cv \quad (11)$$

and the sample temperature rise result can be defined as:

$$\delta Tn = \delta T1*Cv^{n-1}/(Cs+Cv)^{n-1} \quad (12)$$

The above-referenced fractional compensating heat equations can provide a total compensated heat $\delta Qc$ in the sample container 102:

$$\delta Qc = \delta q1 + \delta q2 + \delta q3 + \ldots + \delta qn = (\delta T1 + \delta T2 + \ldots + \delta Tn)*Cv \quad (13)$$

which can provide:

$$\delta Qc = \delta T1*Cv*[1+Cv/(Cs+Cv)+ \ldots +Cv^{n-1}/(Cs+Cv)^{n-1}] \quad (14)$$

As the incremental power compensating steps approach infinity, the mathematical description of the above-referenced series can result in:

$$\delta Qc = \delta T1*Cv*(1+Cv/Cs) \quad (15)$$

Given that the heat of reaction $\delta Q0$ can be released by the sample material 126 and the total compensated heat $\delta Qc$ can be consumed by the sample container 102, the target temperature rise $\delta Tt$ of the sample system at the incremental ramp step $\delta t$, can be:

$$\delta Tt = (\delta Q0 + \delta Qc)/(Cs+Cv) \quad (16)$$

Substituting Eqs. (3) and (15) into Eq. (16) can provide:

$$\delta Tt = \delta Q0/Cs = \delta T0 \quad (17)$$

indicating that the heat $\delta Q0$ released by the sample material 126 at the time interval St can be fully compensated and contained in the sample material 126 (i.e., no heat loss to the sample container 102). The rise of the sample material temperature $\delta Tt$ can reach a theoretical state $\delta T0$. As such, the fourth term of power compensating $\delta Qc/\delta t$ in Eq.1 can be defined. Repeating this incremental compensation heating control step during the complete course of the exothermic event and a self-propelled adiabatic temperature rise curve can be determined.

The adiabatic power compensation DSC 100 can combine adiabatic heat compensation control methodology and dynamic power compensation differential scanning calorimetry to apply self-propelled self-heating reaction processes.

In some instances, the adiabatic power compensation DSC 100 can positively compensate heat only to the sample container 102 and not reversely to the sample material 126 or reaction as in a conventional power compensation DSC. The sample temperature can be allowed to depart progressively from the user-defined temperature ramp rate and proceed autonomously to the self-accelerating reaction stage until its completion.

In other instances, the adiabatic power compensation DSC 100 can further include a four-term ramp-compensation control as defined in Eq. 1. The sample material 126, the sample container 102, and the reference 127 can be subjected to a user-defined temperature up-ramp at a Ramp-Detect (RD) stage. In the beginning of the RD stage, a ramp heating power, $\delta qr/\delta t$, can be equally supplied to the sample 126, 102 and the reference 127, 101. The thermal capacitances of the sample container 102 and the reference container 101 may be identical. When a temperature difference between the sample 126, 102 and the reference 127, 101 is detected, additional sample heating power, $\delta qs/\delta t$, can be supplied. By minimizing the temperature difference between sample 126, 102 and the reference 127, 101, the adiabatic power compensation DSC 100 can allow the temperature of the sample 126, 102 and the reference 127, 101 to follow the user-preprogrammed temperature ramp in the RD stage. The increased ramp compensation power can then be recorded and used to calculate the thermal capacitance of the sample material 126.

When a self-heating event is detected towards the end of the RD stage, in addition to $\delta qs/\delta t$, an adiabatic compensation heating power, $\delta qc+/\delta t$, can be supplied by the adiabatic power compensation DSC 100 so that the sample temperature is allowed to depart from the user-defined preprogrammed temperature ramp throughout the entire exothermic event. For example, upon detecting an exothermic event at the end of the RD stage, the sample 126 can enter a Self-Heating (SH) stage where the sample temperature begins to increase exponentially. The additional heating power, $\delta qc+/\delta t$, can be continuously compensated to the sample container 102 to prevent the sample material's 126 heat transfer to the sample container 102.

The first two terms of Eq. 1 (e.g., $\delta Qr/\delta t$ and $\delta Qs/\delta t$) can provide the energy required for the sample container 102 and the sample material 126 to follow a preprogrammed temperature ramp. It can be constant, linear, and/or related to thermal capacitances of the sample container 102, the sample material 126, and the user-defined preprogrammed temperature ramp rate. The third term of Eq. 1 (e.g., $\delta Qc-/\delta t$) can provide the energy positively to compensate for an endotherm or reversely to compensate for an exotherm, and $\delta Qc+/\delta t$ the fourth-term power can be adjusted positively to compensate the energy required for the sample container 102 to follow a self-propelled exotherm of the sample material 126.

The last term of Eq. 1 (e.g., $\delta Qc+/\delta t$) can be the adiabatic differential power compensation control that can control the heating powers that are supplied to the sample container 102 and the reference container 101. The heat generated by the sample material 126 can be fully contained and consumed by the sample material itself 126 to self-heat and self-propel to its maximum temperature.

In some instances, the adiabatic power compensation DSC 100 can be initiated by a preprogrammed temperature ramp in the RD stage. The adiabatic power compensation DSC 100 can further detect and minimize thermal capacitance induced temperature difference between the sample 126, 102 and the reference 127, 101 by ramp compensation heating control. Upon detecting a self-heating event (e.g., as the temperature ramp goes into the SH stage), the adiabatic compensation heating control can be activated and the heat output of the sample heater 104 can be adjusted to prevent the reaction heat released by the sample material 126 from being transferred into the sample container 102. As such, the self-heating sample material 126 can be adiabatically self-propelled to a maximum temperature.

In other instances, the fourth term of compensating power in Eq. 1 (e.g., $\delta Qc+/\delta t$) can be incorporated into a differential power compensation control algorithm. Dynamically comparing the compensated heats and minimizing temperature differences between the sample 126, 102 and the reference 127, 101 can ensure convergence of adiabatic compensation heating control. For example, neither over-compensating nor under-compensating can occur, thereby providing a state of true adiabatic temperature rise.

In some instances, the sample temperature sensor plate 108 can be thermally coupled to the bottom of the sample container 102, and the reference temperature sensor plate 107 can be thermally coupled to the bottom of the reference container 101. The sample temperature sensor plate 108 and the reference temperature sensor plate 107 can be composed of any suitable thermal sensing technology including a sheathed platinum resistance thermometer or a sheathed thermocouple with high thermal conductivity material including at least one of aluminum, copper, and silver. The sample container 102 can be closely in contact with the sample compensating heater block 106 with a seam approximately between 0.02 mm to 0.2 mm, the sample compensating heater block 106 providing heat to the entirety of the sample container 102. The reference container 101 can be closely in contact with the sample compensating heater block 105 with a seam approximately between 0.02 mm to 0.2 mm, the reference compensating heater block 105 providing heat to the entirety of the reference container 101.

In another instance, the sample compensating heater block 106 can be a cylindrical sample compensating heater block that encapsulates and can be in close contact with the sample container 102. The reference compensating heater block 105 can be a cylindrical reference compensating heater block that encapsulates and can be in close contact with the reference container 101. The sample compensating heater block 106 and the reference compensating heater block 105 can include at least one of a wire heating element or a cartridge heating element that may be imbedded in the sample compensating heater block 106 and the reference compensating heater block 105. Because of the close contact between the heater block 105, 106 and the container 101, 102, the sample compensating heater block 106 can be isothermal to the sample container 102, and the reference compensating heater block 105 can be isothermal to the reference container 101.

In yet another instance, the at least one furnace 109, 110 can be a thermal shield positioned around the sample compensating heater block 106 and the reference compensating heater block 105. The at least one furnace 109, 110 can be spaced approximately 0.1 cm to 10 cm from the sample compensating heater block 106 and the reference compensating heater block 105. The at least one furnace 109, 110 can include a temperature sensor 113, 114 positioned on a side wall of the at least one furnace 109, 110. The at least one furnace 109, 110 can be adiabatic to the sample container 102, the reference container 101, the sample compensating heater block 106, and the reference compensating heater block 105.

In some instances, the thermal shield 115 can include heating 117 and cooling 118 elements that provide a constant temperature environment. The preprogrammed temperature ramp rate can be approximately between 0.0° C./min. and 100° C./min.

FIG. 2 illustrates a cross-sectional view of an example of an adiabatic power compensation differential scanning calorimeter (DSC) 200 with a single furnace, in accordance with some embodiments. Similar to the adiabatic power compensation DSC 100 of FIG. 1, the adiabatic power compensation DSC 200 can include a reference container 201, a sample container 202, a reference compensating heater block 205, a sample compensating heater block 206, a reference furnace 209, a sample furnace 210, and an enclosure 215.

In some examples, the enclosure 215 can be a temperature thermal shield. The reference furnace 209 and the sample furnace 210 may be connected or a monolithic furnace. In this instance, the heating elements 211, 212 may also be connected or a monolithic heating element. The enclosure 215 can include a temperature sensor 216, a heating element 217, and a cooling element 218. The enclosure 215 may also form a temperature-controlled chamber 221 around the reference furnace 209 and the sample furnace 210.

In some instances, the reference furnace 209 can include a heating element 211, a temperature sensor 213, and a reference furnace lid 223. The reference furnace 209 and the reference furnace lid 223 can encapsulate the reference compensating heater block 205 and provide a temperature controlled environment. Moreover, FIG. 2 illustrates the heating element 211 being imbedded in or wrapped around the sides of the reference furnace 209. However, it is also envisioned that the heating element 211 may be imbedded in, wrapped around, or thermally coupled to all sides of the reference furnace 209.

In other instances, the sample furnace 210 can include a heating element 212, a temperature sensor 214, and a sample furnace lid 222. The temperature sensor 214 of the sample furnace 210 may be the same type of temperature sensor as the temperature sensor 213 of the reference furnace 209. The sample furnace 210 and the sample furnace lid 222 can encapsulate the sample compensating heater block 206 and provide a temperature controlled environment. Moreover, FIG. 2 illustrates the heating element 212 being imbedded in or wrapped around the sides of the sample furnace 210. However, it is also envisioned that the heating element 212 may be imbedded in, wrapped around, or thermally coupled to all sides of the sample furnace 210. In some instances, the average temperature of the reference furnace 209 and the sample furnace 210 may vary according to the different modes before and after the detection of a self-heating event.

In another instance, the reference compensating heater block 205 can include a heating element 203 and a reference temperature sensor plate 207. The reference compensating heater block 205 and the reference temperature sensor plate 207 can encapsulate the reference container 201 and provide a temperature controlled environment. For example, the reference compensating heater block 205 can surround the reference container 201 so that the majority of the outer surface of the reference container 201 is in close contact with the inner surface of the reference compensating heater block 205 to provide compensating heat transfer to the reference container 201. The reference temperature sensor plate 207 may be thermally coupled to the bottom of the reference container 201.

In yet another instance, the sample compensating heater block 206 can include a heating element 204 and a sample temperature sensor plate 208. The sample compensating heater block 206 and the sample temperature sensor plate 208 can encapsulate the sample container 201 and provide a temperature controlled environment. For example, the sample compensating heater block 206 can surround the sample container 202 so that the majority of the outer surface of the sample container 202 is in close contact with the inner surface of the sample compensating heater block 206 to provide compensating heat transfer to the sample container 202. The sample temperature sensor plate 208 may be thermally coupled to the bottom of the sample container 202.

During adiabatic power compensation operation, the reference compensating heater block 205 can provide heat to the reference container 201, and the sample compensating heater block 206 can provide heat to the sample container 202. The reference compensating heater block 205 and the sample compensating heater block 206 are capable of increasing or decreasing heating power to actively minimize temperature differences between the reference container 201 and the sample container 202.

In some instances, the adiabatic power compensation DSC 200 can further include tubes 219, 220 that may couple the reference container 201 and the sample container 202 to a differential pressure manifold (not shown in FIG. 2). The sample container 202 can include a sample material 226 to be tested by the adiabatic power compensation DSC 200. The dimensions and material of construction of the reference container 201 and the sample container 202 can be identical.

The temperature of the sample 226, 202, the temperature of a reference 227, 201, and the temperature difference between the sample 226, 202 and the reference 227, 201 can be monitored by the reference temperature sensor plate 207 and the sample temperature sensor plate 208.

The heating and cooling elements 203, 204, 211, 212, 217, 218 of the reference compensating heater block 205, the sample compensating heater block 206, the reference furnace 209, the sample furnace 210, and the enclosure 215 may be independently controlled by a microprocessor or computer. In some instances, temperature control of the reference compensating heater block 205 and the sample compensating heater block 206 can be based on the differential temperature measuring sensors (e.g., the reference temperature sensor plate 207 and the sample temperature sensor plate 208).

Figure 3:
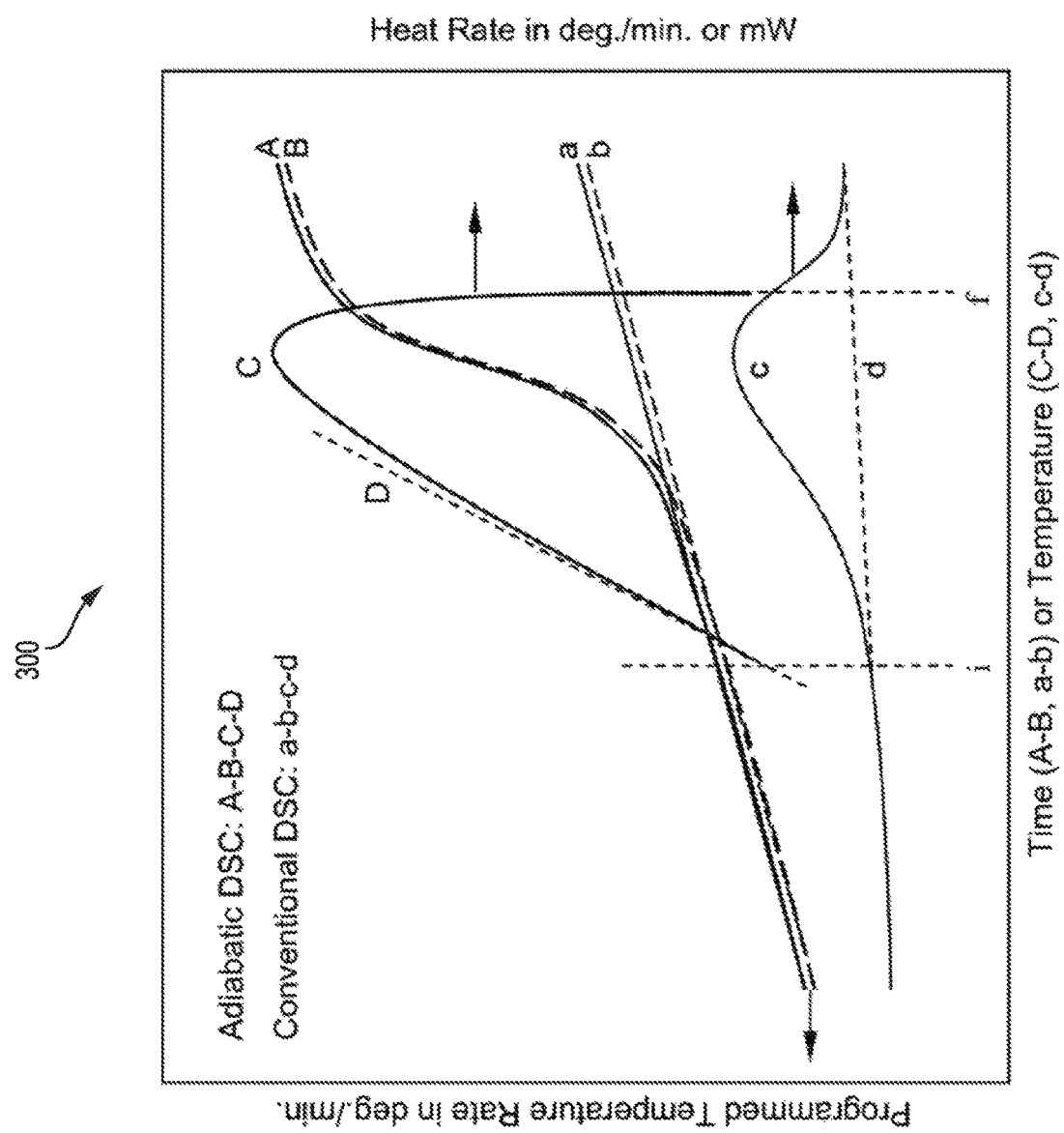
FIG. 3 illustrates an example graph of temperature ramps and heat flows of power compensation differential scanning calorimeters, in accordance with some embodiments.

FIG. 3 illustrates an example graph 300 of temperature ramps and heat flows of an adiabatic power compensation differential scanning calorimeter (100, 200) and a conventional differential scanning calorimeter, in accordance with some embodiments. The temperature difference between a sample (126) and a reference (127) can be continuously measured as the sample (126) and the reference (127) are heated during a preprogrammed temperature ramp as shown in FIG. 3.

Compensating heaters (105, 106, 205, 206) can be controlled by a preprogrammed temperature-controller to heat sample containers (102, 202) and reference containers (101, 201) at an identical rate. The rate at which the temperature of the sample and reference containers changes can be referred to as the preprogrammed scan rate at the beginning of a test run or the self-heating rate upon the detection of an exothermic event. In some embodiments, the scan rate can be between 0.0° C. to 100° C./min or any other scan rate suitable for the intended purpose and understood by a person of ordinary skill in the art.

In some instances, the operating temperature range of the adiabatic power compensation DSC (100, 200) can be between −100° C. to 1000° C. The adiabatic power compensation DSC (100, 200) can measure the temperature of the sample and reference containers, a reference furnace, a sample furnace, and a thermal shield with a temperature accuracy of ±0.01° C. and a temperature precision of ±0.002° C. A person of ordinary skill in the art would understand that the adiabatic power compensation DSC (100, 200) may be modified with a wide range of DSC accessories including sample containers having pressure tracking and venting capabilities.

As shown in FIG. 3, temperature ramps and heat flows of the adiabatic power compensation DSC (100, 200) and the conventional power compensation DSC are illustrated.

A typical thermogram of the conventional power compensation DSC are represented by curves of "a," "b," "c," and "d," where "a" and "b" represent sample and reference temperature scans, respectively, resulting from a preprogrammed linear temperature ramp. Curve "c" represents the heat rate (mW) of the reaction with a user-defined baseline "d." The total energy released by the reaction can be integrated between curves of "c" and "d" between time periods "i" and "j." Upon an exothermic event occurring at point "i," a compensation heater of the conventional power compensation DSC decreases its heating power to balance the heat generated by the sample material or reaction. This allows the sample temperature to follow the preprogrammed temperature ramp so that linear temperature curves result (e.g., "a" for the sample and "b" for the reference).

Temperature ramps and heat rate of the adiabatic power compensation DSC (100, 200) can be represented as curves of "A," "B," "C," and "D," where "A" and "B" can represent sample and reference temperatures, respectively, resulting from a user-defined temperature ramp and an overlapping self-propelled temperature ramp. Upon detection of an exothermic event at point "i." Curve "C" can represent a self-heating rate of a reaction. The sample compensating heater block of the adiabatic power compensation DSC (100, 200) can increase its container-only compensating power output to block the heat transfer from the sample material to its container. The increase in power output by the sample compensating heater block can allow the sample material temperature to follow its own self-heating rate and depart from its preprogrammed linear temperature ramp (e.g., "A" for the sample and "B" for the reference). Time-resolved self-heating rate, maximum temperature rise, sample heat capacitance, total energy released, and activation energy can be defined by the slope "D" or determined by the heat rate curve "C."

Figure 4:
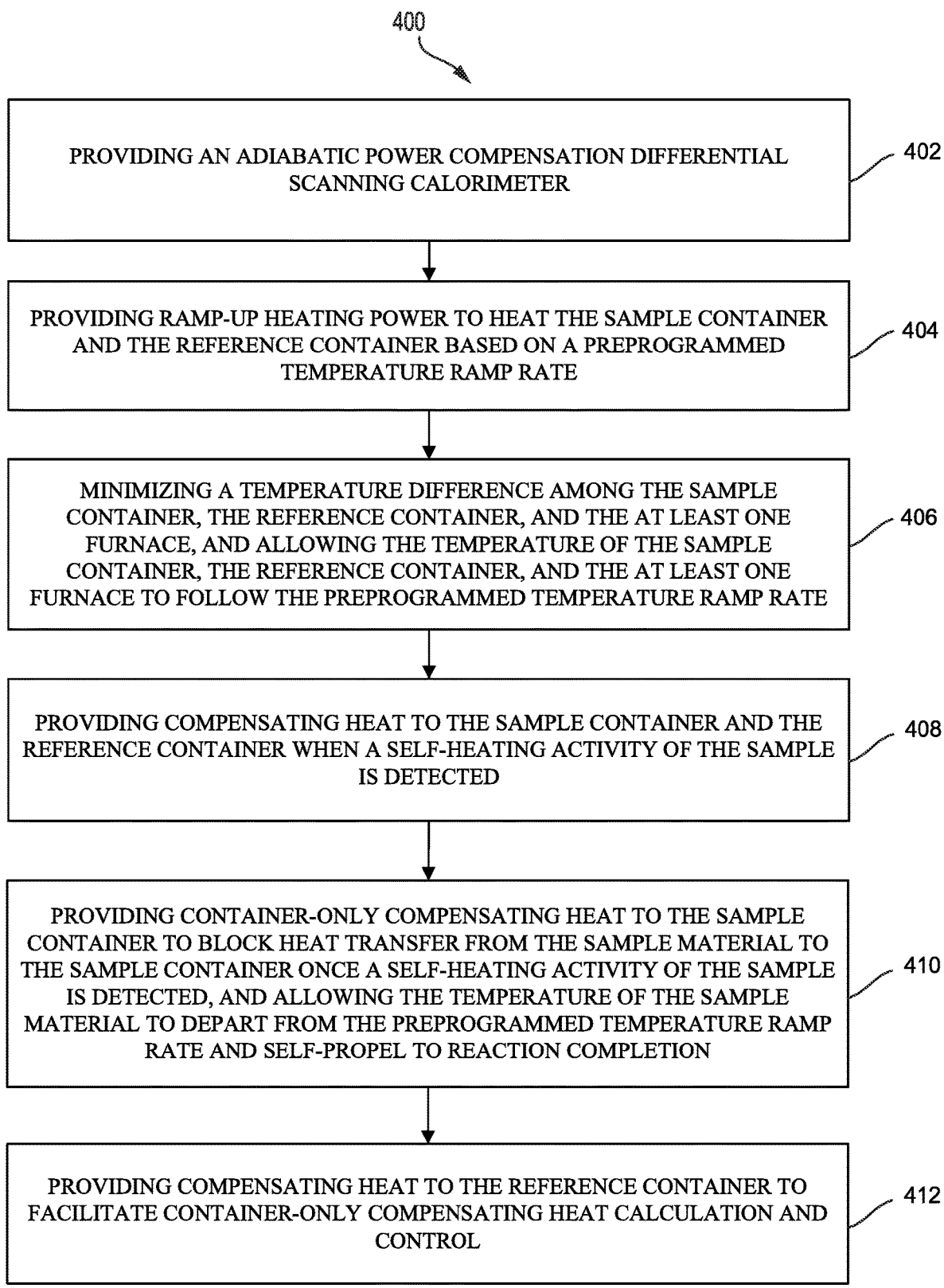
FIG. 4 illustrates an example process for utilizing an adiabatic power compensation differential scanning calorimeter, in accordance with some embodiments.

Having disclosed some example system components and concepts, the disclosure now turns to FIG. 4, which illustrates example method 400 for utilizing an adiabatic power compensation differential scanning calorimeter. The steps outlined herein are exemplary and can be implemented in any combination thereof, including combinations that exclude, add, or modify certain steps.

At step 402, the method 400 can include providing an adiabatic power compensation differential scanning calorimeter. The adiabatic power compensation differential scanning calorimeter can include a sample container configured to house a sample to be tested by the adiabatic power compensation differential scanning calorimeter, the sample container including a sample temperature sensor plate configured to measure a temperature of the sample container; a sample compensating heater block isothermally coupled to the sample container of a volume sized between 0.1 ml to 100 ml; a reference container configured to house a reference material or none to be tested by the adiabatic power compensation differential scanning calorimeter, the reference container including a reference temperature sensor plate configured to measure a temperature of the reference container; a reference compensating heater block isothermally coupled to the reference container of a volume sized between 0.1 ml to 100 ml; at least one furnace configured to adiabatically shield the sample compensating heater block and the reference compensating heater block; a thermal shield configured to enclose the at least one furnace; and a heat compensation control and measurement system for self-heating rate, adiabatic temperature and pressure rises, and activation energy of an exothermic reaction.

At step 404, the method 400 can include providing ramp-up heating power to heat the sample container and the reference container based on a preprogrammed temperature ramp rate.

At step 406, the method 400 can include minimizing a temperature difference among the sample container, the reference container, and the at least one furnace, and allowing the temperature of the sample container, the reference container, and the at least one furnace to follow the preprogrammed temperature ramp rate.

At step 408, the method 400 can include providing compensating heat to the sample container and the reference container when a self-heating activity of the sample material is detected.

At step 410, the method 400 can include providing container-only compensating heat to the sample container to block heat transfer from the sample material to the sample container once the self-heating activity of the sample material is detected, and allow the temperature of the sample material to depart from the preprogrammed temperature ramp rate and self-propel to reaction completion.

At step 412, the method 400 can include providing compensating heat to the reference container to facilitate container-only compensating heat calculation and control.

In some instances, a total amount of the compensating heat provided to the sample container and the reference container can be based on the preprogrammed temperature ramp rate and a self-accelerated temperature rate of the sample material.

In some instances, the preprogrammed temperature ramp rate is approximately between 0.0° C./min. and 100° C./min.

The method 400 can further include controlling a power output to the sample compensating heater block and a power output to the reference compensating heater block to minimize the temperature difference between the sample container and the reference container.

The method 400 can further include, upon detecting exothermic activity of the sample material, increasing compensating power to the sample container to allow the sample material to depart from the preprogrammed temperature ramp rate and self-propel to a maximum temperature.

The method 400 can further include, upon detecting exothermic activity of the sample material, decreasing compensating power to balance the exothermic activity and allowing the sample and the reference to follow the preprogrammed temperature ramp rate.

The method 400 can further include, upon detecting endothermic activity of the sample material, increasing compensating power to balance the endothermic activity and allowing the sample and reference to follow the preprogrammed temperature ramp rate.

Figure 5A:
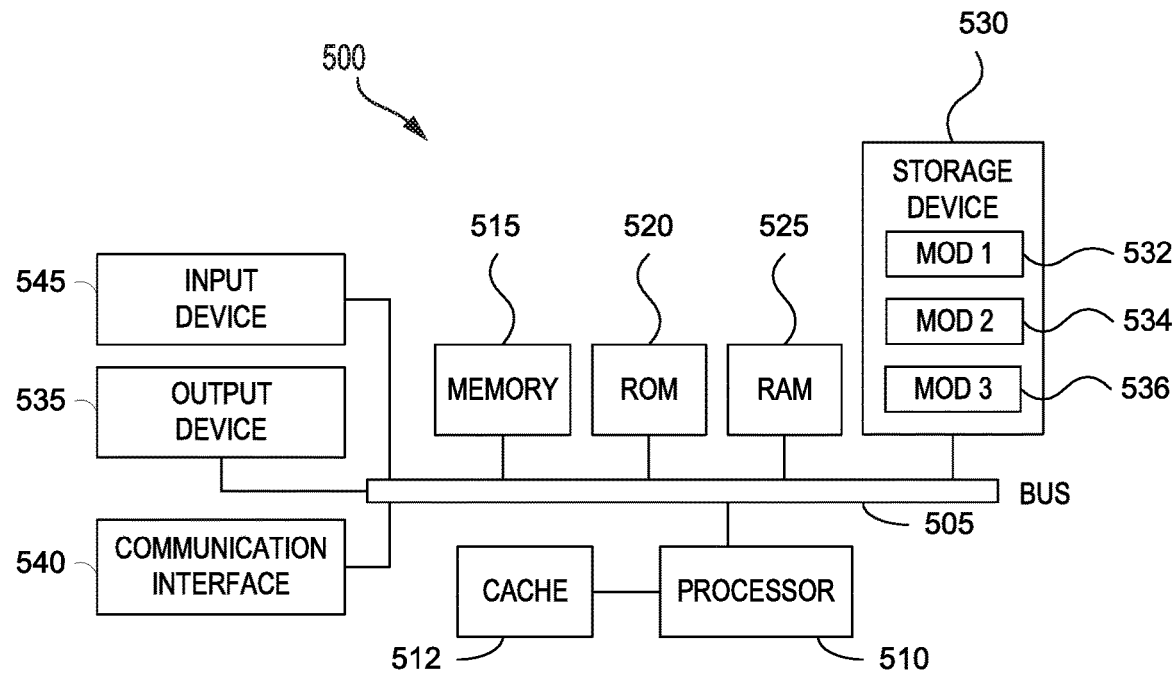
FIGS. 5A and 5B illustrate examples of systems, in accordance with some embodiments.
Figure 5B:
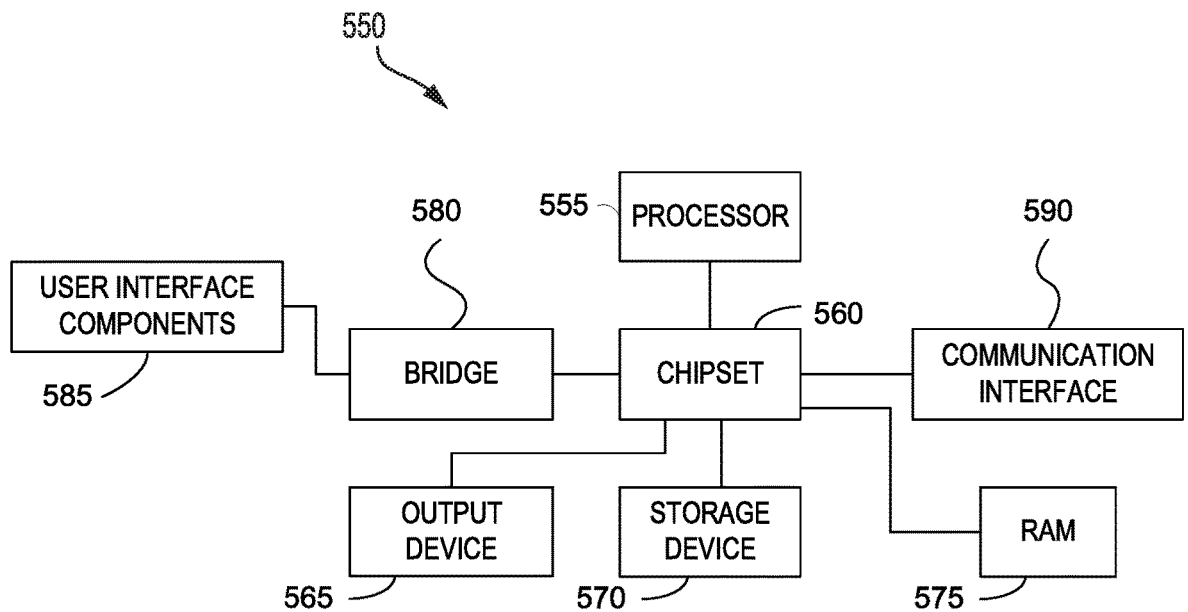

FIGS. 5A and 5B illustrate systems in accordance with various embodiments. The more appropriate system will be apparent to those of ordinary skill in the art when practicing the various embodiments. Persons of ordinary skill in the art will also readily appreciate that other systems are possible.

FIG. 5A illustrates an example of a bus computing system 500 wherein the components of the system are in electrical communication with each other using a bus 505. The computing system 500 can include a processing unit (CPU or processor) 510 and a system bus 505 that may couple various system components including the system memory 515, such as read only memory (ROM) 520 and random access memory (RAM) 525, to the processor 510. The computing system 500 can include a cache 512 of high-speed memory connected directly with, in close proximity to, or integrated as part of the processor 510. The computing system 500 can copy data from the memory 515, ROM 520, RAM 525, and/or storage device 530 to the cache 512 for quick access by the processor 510. In this way, the cache 512 can provide a performance boost that avoids processor delays while waiting for data. These and other modules can control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in the storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing system 500, an input device 545 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

The storage device 530 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 530 can include the software modules 532, 534, 536 for controlling the processor 510. Other hardware or software modules are contemplated. The storage device 530 can be connected to the system bus 505. In some embodiments, a hardware module that performs a particular function can include a software component stored in a computer-readable medium in connection with the necessary hardware components, such as the processor 510, bus 505, output device 535, and so forth, to carry out the function.

FIG. 5B illustrates an example architecture for a chipset computing system 550 that can be used in accordance with an embodiment. The computing system 550 can include a processor 555, representative of any number of physically and/or logically distinct resources capable of executing software, firmware, and hardware configured to perform identified computations. The processor 555 can communicate with a chipset 560 that can control input to and output from the processor 555. In this example, the chipset 560 can output information to an output device 565, such as a display, and can read and write information to storage device 570, which can include magnetic media, solid state media, and other suitable storage media. The chipset 560 can also read data from and write data to RAM 575. A bridge 580 for interfacing with a variety of user interface components 585 can be provided for interfacing with the chipset 560. The user interface components 585 can include a keyboard, a microphone, touch detection and processing circuitry, a pointing device, such as a mouse, and so on. Inputs to the computing system 550 can come from any of a variety of sources, machine generated and/or human generated.

The chipset 560 can also interface with one or more communication interfaces 590 that can have different physical interfaces. The communication interfaces 590 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 555 analyzing data stored in the storage device 570 or the RAM 575. Further, the computing system 550 can receive inputs from a user via the user interface components 585 and execute appropriate functions, such as browsing functions by interpreting these inputs using the processor 555.

It will be appreciated that computing systems 500 and 550 can have more than one processor 510 and 555, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. An adiabatic power compensation differential scanning calorimeter for measuring true adiabatic temperature rise and temperature rate of a self-heating reaction process, the adiabatic power compensation differential scanning calorimeter comprising:
    a sample container configured to house a sample material to be tested by the adiabatic power compensation differential scanning calorimeter;
    a sample compensating heater block isothermally coupled to and enclosing the sample container of a volume sized between 0.1 ml to 100 ml, the sample compensating heater block including a sample temperature sensor configured to measure a temperature of the sample container;
    a reference container configured to house a reference material or none to be tested by the adiabatic power compensation differential scanning calorimeter;
    a reference compensating heater block isothermally coupled to the reference container of a volume sized between 0.1 ml to 100 ml, the reference compensating heater block including a reference temperature sensor configured to measure a temperature of the reference container;
    at least one furnace configured to adiabatically shield the sample compensating heater block and the reference compensating heater block during a preprogrammed temperature ramp and a self-heating temperature ramp of the sample material;
    a thermal shield configured to enclose the at least one furnace, the sample compensating heater block, and the reference compensating heater block; and
    a heat compensation control and measurement system for self-heating rate, adiabatic temperature and pressure rises, and activation energy of an exothermic reaction, the heat compensation control and measurement system being configured to:
        provide ramp-up heating power to heat the sample container and the reference container based on a preprogrammed temperature ramp rate;
        minimize a temperature difference among the sample container, the reference container, and at least one furnace, and allow the temperature of the sample container, the reference container, and the at least one furnace to follow the preprogrammed temperature ramp rate;
        calculate a thermal capacitance of the sample material based on a heating power difference between the sample container and the reference container;
        provide container-only compensating heat to the sample container to block heat transfer from the sample material to the sample container once a self-heating activity of the sample material is detected, and allow the temperature of the sample material to depart from the preprogrammed temperature ramp rate and self-propel to reaction completion; and
        provide compensating heat to the reference container to facilitate container-only compensating heat calculation and control.

2. The adiabatic power compensation differential scanning calorimeter of claim 1, wherein the sample temperature sensor is thermally coupled to a bottom of the sample compensating heater block, and
    wherein the reference temperature sensor is thermally coupled to the bottom of the reference compensating heater block.

3. The adiabatic power compensation differential scanning calorimeter of claim 1, wherein the sample temperature sensor and the reference temperature sensor are made of a high thermal conductivity material including at least one of aluminum, copper, and silver.

4. The adiabatic power compensation differential scanning calorimeter of claim 1, wherein the sample container is in close contact with the sample compensating heater block with a seam approximately between 0.02 mm to 0.2 mm, the sample compensating heater block providing heat to an entirety of the sample container enabling a fast heat transfer between the sample compensating heater block and the sample container, and
    wherein the reference container being in close contact with the reference compensating heater block with a seam approximately between 0.02 mm to 0.2 mm, the reference compensating heater block providing heat to an entirety of the reference container enabling a fast heat transfer between the reference compensating heater block and the reference container.

5. The adiabatic power compensation differential scanning calorimeter of claim 1, wherein the sample compensating heater block is a cylindrical sample compensating heater block that encapsulates the sample container, and the reference compensating heater block is a cylindrical reference compensating heater block that encapsulates the reference container.

6. The adiabatic power compensation differential scanning calorimeter of claim 1, wherein the sample compensating heater block and the reference compensating heater block include at least one of a cartridge heating element or a wire heating element imbedded in the sample compensating heater block and the reference compensating heater block.

7. The adiabatic power compensation differential scanning calorimeter of claim 1, wherein the sample compensating heater block is isothermally coupled to the sample container, and the reference compensating heater block is isothermally coupled to the reference container.

8. The adiabatic power compensation differential scanning calorimeter of claim 1, wherein the at least one furnace is a thermal shield positioned adiabatically around the sample compensating heater block and the reference compensating heater block.

9. The adiabatic power compensation differential scanning calorimeter of claim 1, wherein the at least one furnace is spaced approximately 0.5 cm to 5 cm from the sample compensating heater block and the reference compensating heater block.

10. The adiabatic power compensation differential scanning calorimeter of claim 1, wherein the at least one furnace includes a temperature sensor positioned on a side wall of the at least one furnace.

11. The adiabatic power compensation differential scanning calorimeter of claim 1, wherein the at least one furnace is adiabatically controlled to the sample container, the reference container, the sample compensating heater block, and the reference compensating heater block.

12. The adiabatic power compensation differential scanning calorimeter of claim 1, wherein the thermal shield includes heating and cooling elements that provide a constant temperature environment.

13. The adiabatic power compensation differential scanning calorimeter of claim 1, wherein the preprogrammed temperature ramp rate is approximately between 0.00° C./min and 100° C./min.

14. A method for determining a temperature rise and a temperature rate of a self-heating sample or chemical reaction, the method comprising:
   providing an adiabatic power compensation differential scanning calorimeter comprising:
      a sample container configured to house a sample to be tested by the adiabatic power compensation differential scanning calorimeter;
      a sample compensating heater block isothermally coupled to and enclosing the sample container of a volume sized between 0.1 ml to 100 ml, the sample compensating heater block including a sample temperature sensor configured to measure a temperature of the sample container;
      a reference container configured to house a reference material or none to be tested by the adiabatic power compensation differential scanning calorimeter;
      a reference compensating heater block isothermally coupled to the reference container of a volume sized between 0.1 ml to 100 ml, the reference compensating heater block including a reference temperature sensor configured to measure a temperature of the reference container;
      at least one furnace configured to adiabatically shield the sample compensating heater block and the reference compensating heater block during a preprogrammed temperature ramp and a self-heating temperature ramp of the sample material;
      a thermal shield configured to enclose the at least one furnace, the sample compensating heater block, and the reference compensating heater block; and
      a heat compensation control and measurement system for self-heating rate, adiabatic temperature and pressure rises, and activation energy of an exothermic reaction;
   providing ramp-up heating power to heat the sample container and the reference container based on a preprogrammed temperature ramp rate;
   minimizing a temperature difference among the sample container, the reference container, and the at least one furnace, and allowing the temperature of the sample container, the reference container, and the at least one furnace to follow the preprogrammed temperature ramp rate;
   providing compensating heat to the sample container and the reference container when a self-heating activity of the sample material is detected;
   calculating a thermal capacitance of the sample material based on a heating power difference between the sample container and the reference container;
   providing container-only compensating heat to the sample container to block heat transfer from the sample material to the sample container once the self-heating activity of the sample material is detected, and allowing the temperature of the sample material to depart from the preprogrammed temperature ramp rate and self-propel to reaction completion; and
   providing compensating heat to the reference container to facilitate container-only compensating heat calculation and control.

15. The method of claim 14, wherein a total amount of the compensating heat provided to the sample container and the reference container is based on the preprogrammed temperature ramp rate and a self-accelerated temperature rate of the sample material.

16. The method of claim 14, further comprising controlling a power output to the sample compensating heater block and a power output to the reference compensating heater block to minimize the temperature difference between the sample container and the reference container.

17. The method of claim 14, further comprising, upon detecting exothermic activity of the sample material, increasing compensating power to the sample container to allow the sample material to depart from the preprogrammed temperature ramp rate and self-propel to a maximum temperature.

18. The method of claim 14, further comprising, upon detecting exothermic activity of the sample material, decreasing compensating power to balance the exothermic activity and allowing the sample and the reference to follow the preprogrammed temperature ramp rate.

19. The method of claim 14, further comprising, upon detecting endothermic activity of the sample material, increasing compensating power to balance the endothermic activity and allowing the sample and reference to follow the preprogrammed temperature ramp rate.

20. The method of claim 14, wherein the preprogrammed temperature ramp rate is approximately between 0.0° C./min and 100° C./min.

* * * * *